United States Patent
Miyamoto et al.

(10) Patent No.: US 9,109,159 B2
(45) Date of Patent: *Aug. 18, 2015

(54) LIQUID CRYSTALLINE POLYESTER AND PRODUCTION METHOD OF THE SAME

(75) Inventors: Kohei Miyamoto, Nagoya (JP); Mitsushige Hamaguchi, Nagoya (JP); Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 172 days.

This patent is subject to a terminal disclaimer.

(21) Appl. No.: 13/997,730

(22) PCT Filed: Dec. 14, 2011

(86) PCT No.: PCT/JP2011/006969
§ 371 (c)(1), (2), (4) Date: Jun. 25, 2013

(87) PCT Pub. No.: WO2012/090406
PCT Pub. Date: Jul. 5, 2012

(65) Prior Publication Data
US 2013/0270481 A1  Oct. 17, 2013

(30) Foreign Application Priority Data
Dec. 27, 2010  (JP) ................................ 2010-289706

(51) Int. Cl.
*C09K 19/38* (2006.01)
*C08G 63/60* (2006.01)
*C08G 63/78* (2006.01)
*C08K 7/14* (2006.01)
*C08G 63/19* (2006.01)

(52) U.S. Cl.
CPC .......... *C09K 19/3809* (2013.01); *C08G 63/605* (2013.01); *C08G 63/78* (2013.01); *C08K 7/14* (2013.01); *C08G 63/19* (2013.01)

(58) Field of Classification Search
CPC ...... C08G 63/19; C08G 63/605; C08G 63/78; C08L 67/03; C09K 19/3809
See application file for complete search history.

(56) References Cited

U.S. PATENT DOCUMENTS

| | | | |
|---|---|---|---|
| 4,983,713 A | 1/1991 | Hayashi et al. | |
| 7,914,699 B2 * | 3/2011 | Tachikawa et al. | 252/299.01 |
| 8,440,780 B2 * | 5/2013 | Hamaguchi et al. | 528/191 |
| 2007/0243376 A1 | 10/2007 | Tachikawa et al. | |
| 2012/0065342 A1 | 3/2012 | Hamaguchi et al. | |

FOREIGN PATENT DOCUMENTS

| | | |
|---|---|---|
| JP | 05-295093 A | 11/1993 |
| JP | 08-134195 A | 5/1996 |
| JP | 2004-352862 A | 12/2004 |
| JP | 2006-089714 A | 4/2006 |
| JP | 2006-265392 A | 10/2006 |
| JP | 2007-169379 A | 7/2007 |
| JP | 2009-057402 A | 3/2009 |
| JP | 2010-248681 A | 11/2010 |
| TW | 200600567 | 1/2006 |
| WO | 2007/0243376 A1 | 12/2010 |

* cited by examiner

*Primary Examiner* — Shean C Wu
(74) *Attorney, Agent, or Firm* — DLA Piper LLP (US)

(57) ABSTRACT

A liquid crystalline polyester having structural units (I), (II), (III), (IV) and (V), wherein
a ratio of the structural unit (I) to sum of the structural units (I), (II) and (III) is 68 to 80 mol %, a ratio of the structural unit (II) to sum of the structural units (II) and (III) is 55 to 75 mol %, and a ratio of the structural unit (IV) to sum of the structural units (IV) and (V) is 60 to 85 mol %, wherein
a total amount of the structural units (II) and (III) is substantially equimolar with a total amount of the structural units (IV) and (V), and ΔS (entropy of melting) defined by Equation [1] given below is 1.0 to 3.0×10⁻³ J/g·K:

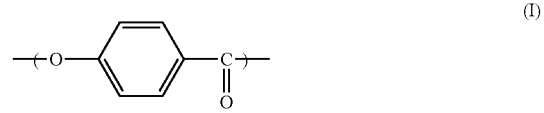

(I)

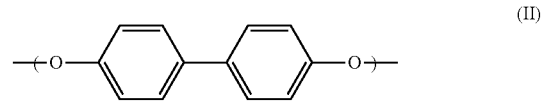

(II)

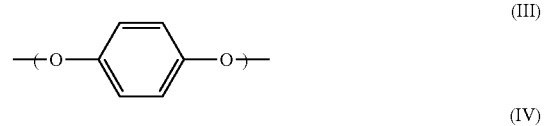

(III)

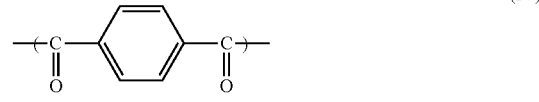

(IV)

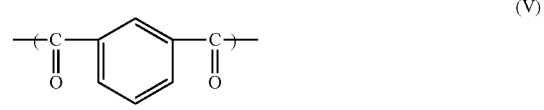

(V)

ΔS (J/g·K) = ΔHm (J/g)/Tm (K).   [1]

10 Claims, 1 Drawing Sheet

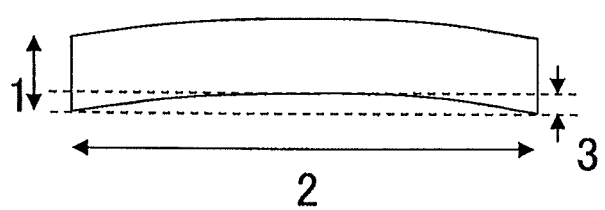

LIQUID CRYSTALLINE POLYESTER AND PRODUCTION METHOD OF THE SAME

TECHNICAL FIELD

This disclosure relates to a liquid crystalline polyester having excellent precision molding stability such as a small variation in resin metering time and a small variation in injection peak pressure during injection molding, excellent dimensional stability under reflow and excellent strength of a small thin-walled molded product, as well as a production method of the same and a resin composition and a molded product obtained therefrom.

BACKGROUND

The heat resistance, the fluidity, dimensional stability and the electrical characteristics of the liquid crystalline polyester may be improved by controlling the crystallinity of the liquid crystalline polyester according to the molecular structure and the production method. The demand of the liquid crystalline polyester has been expanded especially for small precision molded products in electrical and electronic applications. The liquid crystalline polyester, however, has high response to temperature during melting and may accordingly have the following problems: decrease of productivity due to a variation in resin metering time and a variation in injection peak pressure during injection molding; low strength of a small thin-wall molded product, such as low strength to insulator winding; and significant change before and after heating by the residual stress of the polymer itself and the residual stress during molding.

To solve such problems arising with respect to the liquid crystalline resins, for example, one proposed technique of improving the moldability decreases $\Delta S$ (entropy of melting) as the index representing the crystallinity of the liquid crystalline resin, to array the molecular chains of the liquid crystalline resin in a well-ordered state (see, for example, JP 2004-352862 A and JP 2006-089714 A). Another proposed technique increases $\Delta H$ (enthalpy of melting) as the index representing the degree of crystallinity, to enhance the characteristics such as chemical resistance and hydrolysis resistance of the liquid crystalline resin (see, for example, JP H08-134195 A. There is, on the other hand, a proposed technique of decreasing $\Delta H$ (enthalpy of melting) to improve the abrasion resistance of the fibers of the liquid crystalline resin (see, for example, JP 2010-248681 A).

The prior art techniques described above, however, still have a problem that the excessively low crystallinity causes insufficient strength of a small thin-wall molded product. On the other hand, the prior art techniques described above also have a problem that the excessively high crystallinity decreases the precision molding stability.

It could therefore be helpful to provide a liquid crystalline polyester having excellent precision molding stability such as a small variation in resin metering time and a small variation in injection peak pressure during injection molding, excellent dimensional stability under reflow and excellent strength of a small thin-walled molded product, as well as a production method of the same and a resin composition and a molded product obtained therefrom.

SUMMARY

We found that the liquid crystalline polyester having a specific composition and $\Delta S$ (entropy of melting) in a specific range specifically has a small variation in resin metering time and a small variation in injection peak pressure during injection molding to have excellent precision molding stability and also has high dimensional stability under reflow and high strength of a small thin-wall molded product.

We thus provide:

(1) A liquid crystalline polyester having structural units (I), (II), (III), (IV) and (V). The ratio of the structural unit (I) to sum of the structural units (I), (II) and (III) is 68 to 80 mol %. The ratio of the structural unit (II) to sum of the structural units (II) and (III) is 55 to 75 mol %. The ratio of the structural unit (IV) to sum of the structural units (IV) and (V) is 60 to 85 mol %. The total amount of the structural units (II) and (III) is substantially equimolar with a total amount of the structural units (IV) and (V). $\Delta S$ (entropy of melting) defined by Equation [1] is 1.0 to $3.0 \times 10^{-3}$ J/g·K:

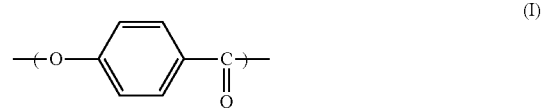

(I)

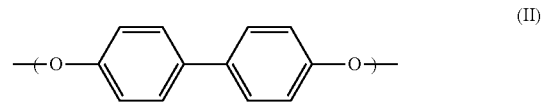

(II)

(III)

(IV)

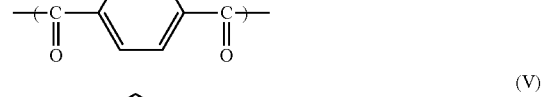

(V)

$$\Delta S \text{ (J/g·K)} = \Delta Hm \text{ (J/g)/Tm (K)} \quad [1]$$

(Tm herein means an endothermic peak temperature (Tm3) observed in differential scanning calorimetry, in which after observation of an endothermic peak temperature (Tm1) in measurement with heating polymer of completed polymerization at a rate of temperature of 20° C./minute from room temperature, an endothermic peak temperature (Tm2) is observed when temperature is sequentially maintained at Tm1+20° C. for 5 minutes, decreased to room temperature at a rate of 20° C./minute, and increased again at a rate of 20° C./minute, in which after observation of the endothermic peak temperature (Tm2), the endothermic peak temperature (Tm3) is observed when temperature is sequentially maintained at Tm1+20° C. for 5 minutes, decreased to room temperature at a rate of 20° C./minute, and increased again at a rate of 20° C./minute, and in which $\Delta Hm$ represents an endothermic peak area ($\Delta Hm3$) at the temperature Tm3).

(2) The liquid crystalline polyester described in (1) having a degree of dispersion (Mw/Mn) of not greater than 2.5, which is calculated by dividing a weight-average molecular weight (Mw) by a number-average molecular weight (Mn).

In the liquid crystalline polyester described in (1) above, however, the degree of dispersion (Mw/Mn) may be greater than 2.5.

(3) A production method of the liquid crystalline polyester described in (1) or (2). The production method acetylates hydroxyl group of an aromatic hydroxycarboxylic acid and an aromatic diol as raw materials of the liquid crystalline polyester with acetic anhydride and then performs deacetylation polymerization to produce the liquid crystalline polyester. A jacket temperature during deacetylation polymerization is raised at an average rate of temperature increase of 1.0 to 1.6° C./minute from 270° C. to a maximum temperature of polymerization.

In the production method of the liquid crystalline polyester described in (1) or (2), however, the average rate of temperature increase may be lower than 1.0° C./minute. In the production method of the liquid crystalline polyester described in (1) or (2), the average rate of temperature increase may be higher than 1.6° C./minute.

(4) A liquid crystalline polyester resin composition comprising: 10 to 200 parts by weight of a filler added relative to 100 parts by weight of the liquid crystalline polyester described in (1) or (2).

The content of the filler relative to the liquid crystalline polyester described in (1) or (2) above may, however, be less than 10 parts by weight relative to 100 parts by weight of the liquid crystalline polyester. The content of the filler relative to the liquid crystalline polyester described in (1) or (2) above may be greater than 200 parts by weight relative to 100 parts by weight of the liquid crystalline polyester.

(5) A molded product produced by melt-molding the liquid crystalline polyester described in (1) or (2) or the liquid crystalline polyester resin composition described in (4).

The molded product may, however, be produced from the liquid crystalline polyester described in (1) or (2) or from the liquid crystalline polyester resin composition described in (4) by a different method from melt-molding.

The liquid crystalline polyester has excellent precision molding stability such as a small variation in resin metering time and a small variation in injection peak pressure during injection molding, excellent dimensional stability under reflow and excellent strength of a small thin-walled molded product. Using the liquid crystalline polyester provides a molded product having excellent dimensional stability under reflow and excellent strength of a small thin-walled molded product.

BRIEF DESCRIPTION OF THE DRAWINGS

FIG. 1 is a conceptual diagram illustrating a measurement site of warpage of a fine pitch connector produced in the Examples and Comparative Examples.

REFERENCE SIGNS LIST

1 Pin press-in direction
2 Longitudinal direction of connector
3 Warpage

DETAILED DESCRIPTION

The following describes our liquid crystalline polyesters and methods in detail.

The liquid crystalline polyester is polyester called thermotropic liquid crystalline polymer having optical anisotropy in the molten state and has structural units (I), (II), (III), (IV) and (V) given below. The ratio of the structural unit (I) to the sum of the structural units (I), (II) and (III) is 68 to 80 mol %. The ratio of the structural unit (II) to the sum of the structural units (II) and (III) is 55 to 75 mol %. The ratio of the structural unit (IV) to the sum of the structural units (IV) and (V) is 60 to 85 mol %. The total amount of the structural units (II) and (III) is substantially equimolar with the total amount of the structural units (IV) and (V). $\Delta S$ (entropy of melting) defined by Equation [1] is 1.0 to $3.0 \times 10^{-3}$ J/g·K.

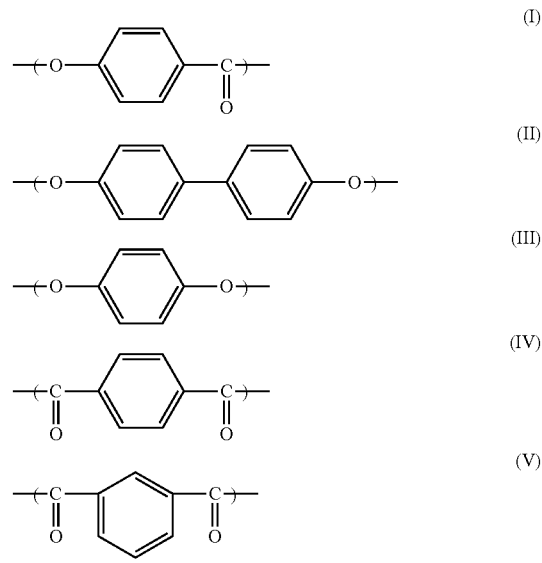

$$\Delta S (J/g \cdot K) = \Delta Hm (J/g)/Tm (K) \quad [1]$$

(Tm herein means an endothermic peak temperature (Tm3) observed in differential scanning calorimetry, in which after observation of an endothermic peak temperature (Tm1) in measurement with heating polymer of completed polymerization at a rate of temperature of 20° C./minute from room temperature, an endothermic peak temperature (Tm2) is observed when temperature is sequentially maintained at Tm1+20° C. for 5 minutes, decreased to room temperature at a rate of 20° C./minute, and increased again at a rate of 20° C./minute, in which after observation of the endothermic peak temperature (Tm2), the endothermic peak temperature (Tm3) is observed when temperature is sequentially maintained at Tm1+20° C. for 5 minutes, decreased to room temperature at a rate of 20° C./minute, and increased again at a rate of 20° C./minute, and in which $\Delta Hm$ represents an endothermic peak area ($\Delta Hm3$) at the temperature Tm3).

The above structural unit (I) represents a structural unit derived from p-hydroxybenzoic acid; the structural unit (II) represents a structural unit derived from 4,4'-dihydroxybiphenyl; the structural unit (III) represents a structural unit derived from hydroquinone; the structural unit (IV) represents a structural unit derived from terephthalic acid; the structural unit (V) represents a structural unit derived from isophthalic acid.

The ratio of the structural unit (I) to the sum of the structural units (I), (II) and (III) is 68 to 80 mol %. The ratio is preferably not less than 70 mol % and more preferably not less than 73 mol %. The ratio is, on the other hand, preferably not greater than 78 mol %.

The ratio of the structural unit (II) to the sum of the structural units (II) and (III) is 55 to 75 mol %. The ratio is preferably not less than 58 mol %. The ratio is, on the other hand, preferably not greater than 70 mol % and more preferably not greater than 65 mol %.

The ratio of the structural unit (IV) to the sum of the structural units (IV) and (V) is 60 to 85 mol %. The ratio is preferably not less than 65 mol % and more preferably not less than 70 mol %.

The total amount of the structural units (II) and (III) is substantially equimolar with the total amount of the structural units (IV) and (V). The term "substantially equimolar" herein means that the structural units forming the polymer main chain except terminal-groups are equimolar. Even the non-equimolar composition when including the structural units of the terminal-groups may accordingly satisfy the "substantially equimolar" requirement.

The contents of the respective structural units may be calculated from the ratio of areas of peaks corresponding to the respective structural units in $^1$H-NMR spectroscopy of the liquid crystalline polyester weighed in an NMR (Nuclear Magnetic Resonance) sample tube and dissolved in a liquid crystalline polyester-soluble solvent (for example, a mixed solvent of pentafluorophenol/1,1,2,2-tetrachloroethane-$d_2$).

Setting the contents of the respective structural units (I) to (V) to the above ranges readily gives the liquid crystalline polyester having ΔS (entropy of melting) in the range described below. Setting the contents of the respective structural units to the more preferable ranges advantageously facilitates control of the crystallinity and thereby readily gives the liquid crystalline polyester having ΔS (entropy of melting) in the more preferable range.

The liquid crystalline polyester has ΔS (entropy of melting), which is defined by Equation [1], of 1.0 to $3.0 \times 10^{-3}$ J/g·K. Such liquid crystalline polyester is found to have high crystallinity and excellent melting characteristic and develop high molding stability and physical properties of a small precision molded product.

$$\Delta S(J/g \cdot K) = \Delta Hm(J/g)/Tm(K) \quad [1]$$

Tm (melting point) means an endothermic peak temperature (Tm3) observed in differential scanning calorimetry, in which after observation of an endothermic peak temperature (Tm1) in measurement with heating polymer of completed polymerization at a rate of temperature of 20° C./minute from room temperature, an endothermic peak temperature (Tm2) is observed when temperature is sequentially maintained at Tm1+20° C. for 5 minutes, decreased to room temperature at a rate of 20° C./minute, and increased again at a rate of 20° C./minute, in which after observation of the endothermic peak temperature (Tm2), the endothermic peak temperature (Tm3) is observed when temperature is sequentially maintained at Tm1+20° C. for 5 minutes, decreased to room temperature at a rate of 20° C./minute, and increased again at a rate of 20° C./minute, and in which ΔHm represents an endothermic peak area (ΔHm3) at the temperature Tm3.

Ordinarily, Tm2 and Tm3 are equivalent to each other, and the corresponding endothermic peak areas (ΔHm2 and ΔHm3) are also equivalent to each other. Stretch after melting of the polymerized polymer in the course of processing to fibers or film may, however, interfere with such equivalency. The stretch after melting strongly orients the polymer molecules and may not allow the orientation to be sufficiently lowered even at the second time of temperature increase in differential scanning calorimetry. This may interfere with development of the original polymer properties with respect to Tm2 and ΔHm2 and may give Tm2 and Tm3 of different values and ΔHm2 and ΔHm3 of different values. Accordingly, Tm3 and ΔHm3 that are free of external influences should be used to calculate the accurate ΔS (entropy of melting) of the polymer.

The liquid crystalline polyester has ΔS (entropy of melting) of 1.0 to $3.0 \times 10^{-3}$ J/g·K. ΔS (entropy of melting) is preferably not less than $1.2 \times 10^{-3}$ J/g·K and more preferably not less than $1.5 \times 10^{-3}$ J/g·K. ΔS (entropy of melting) is, on the other hand, preferably not greater than $2.6 \times 10^{-3}$ J/g·K and more preferably not greater than $2.2 \times 10^{-3}$ J/g·K. ΔS (entropy of melting) of this range ensures the balance between the melting characteristic and the crystallinity of the liquid crystalline polyester and thereby specifically improves the moldability. Especially during injection molding of a small precision molded product, ΔS of this range reduces a variation in resin metering time due to easy melting and a variation in injection peak pressure among the respective shots due to crystallinity (solidification characteristic). Additionally, ΔS of this range has advantageous effects during molding, for example, the adequate crystallinity to specifically improve the dimensional stability under reflow soldering and the balance between tenacity and rigidity to improve the strength of a small thin-walled molded product.

ΔS (entropy of melting) of less than $1.0 \times 10^{-3}$ J/g·K causes a variation in melting during injection molding metering, thus increasing the variation in resin metering time and the variation in injection peak pressure and lowering the precision molding stability. Such ΔS gives the low crystallinity to increase the likelihood of a distortion in molecules during molding and thereby increases warpage of a molded product after reflow process and lowers the dimensional stability under reflow. The low crystallinity also decreases the surface hardness and thereby lowers the strength of a small thin-wall molded product. ΔS (entropy of melting) of greater than $3.0 \times 10^{-3}$ J/g·K, on the other hand, causes excessive increases in enthalpy of melting and in solidification rate during molding, thus increasing the variation in resin metering time and the variation in injection peak pressure and lowering the precision molding stability. Such ΔS gives the high crystallinity to cause solidification in a distorted state during molding and thereby increases warpage of a molded product after reflow process and lowers the dimensional stability under reflow. Such ΔS also increases brittleness and thereby decreases the strength of a small thin-walled molded product.

Setting the contents of the above structural units (I) to (V) in the above specific ranges is effective to give the liquid crystalline polyester having ΔS (entropy of melting) of the above range.

When there is no peak observed in measurement of ΔHm (enthalpy of melting) and the melting point (Tm), ΔS is not calculable. The liquid crystalline polyester with no peak observed has low heat resistance and is thus undesirable.

In the light of the balance between workability and heat resistance, the melting point (Tm) of the liquid crystalline polyester is preferably 220 to 350° C., more preferably 270 to 345° C. and further more preferably 300 to 340° C.

The number-average molecular weight of the liquid crystalline polyester is preferably 3,000 to 50,000, more preferably 8,000 to 30,000 and further more preferably 8,000 to 20,000.

The liquid crystalline polyester preferably has the degree of dispersion or the division of the weight-average molecular weight by the number-average molecular weight of not greater than 2.5. The degree of dispersion of not greater than 2.5 causes a sharp distribution of molecular weight, thereby ensuring the good melting characteristic and the good crystallinity and especially improving the precision molding stability and the strength of a small thin-walled molded product. The improved strength of a small thin-walled molded product by setting the degree of dispersion to be not greater than 2.5 may be attributed to the increased surface hardness of the molded product by the high crystallinity. The degree of dispersion is preferably not greater than 2.2 and more preferably not greater than 2.0.

The weight-average molecular weight and the number-average molecular weight are measurable by GPC-LS (gel permeation chromatography/light scattering) method using a liquid crystalline polyester-soluble solvent as the eluent. Available examples of the liquid crystalline polyester-soluble solvent include halogenated phenols and mixed solvents of halogenated phenols and general organic solvents. Preferable examples are pentafluorophenol and a mixed solvent of pentafluorophenol and chloroform. In terms of handling, the pentafluorophenol/chloroform mixed solvent is especially preferable among them.

The melt viscosity of the liquid crystalline polyester is preferably 1 to 200 Pa·s, more preferably 10 to 100 Pa·s and further more preferably 20 to 50 Pa·s. The melt viscosity is measured with a Koka-type flow tester at a shear rate of 1000/second under the temperature condition of the melting point of the liquid crystalline polyester+10° C.

The liquid crystalline polyester may be produced by the known deacetylation polymerization method of polyester. For example, the method acetylates the phenolic hydroxyl group of specified amounts of aromatic hydroxycarboxylic acid and aromatic diol with acetic anhydride and then performs deacetylation polymerization. The aromatic hydroxycarboxylic acid and the aromatic diol are p-hydroxybenzoic acid and 4,4'-dihydroxybiphenyl and hydroquinone.

In the acetylation process, a preferable procedure mixes specified amounts of p-hydroxybenzoic acid, 4,4'-dihydroxybiphenyl, hydroquinone, terephthalic acid, isophthalic acid and acetic anhydride in a reaction vessel and heats the mixture with stirring in nitrogen gas atmosphere for acetylation of the hydroxyl group. The reaction vessel may be equipped with stirring blades, may be equipped with a distillation pipe, and may be equipped with an outlet in its bottom portion. The conditions of acetylation are generally 1 to 3 hours in a temperature range of 130 to 150° C.

The amount of acetic anhydride used is preferably 1.00 to 1.15 mole equivalents, more preferably 1.05 to 1.12 mole equivalents and further more preferably 1.07 to 1.12 mole equivalents relative to the total amount of the phenolic hydroxyl group in p-hydroxybenzoic acid, 4,4'-dihydroxybiphenyl and hydroquinone. Setting the amount of acetic anhydride used to the above range facilitates control of the acetylation rate of hydroquinone having low acetylation reaction rate and gives the excellent liquid crystalline polyester with less gas evolution and its resin composition.

In the deacetylation polymerization process, the melt polymerization method is preferably adopted to complete the polymerization reaction under reduced pressure at a temperature at which the liquid crystalline polyester melts. More specifically, to allow the reaction to proceed with distillate of acetic acid after the acetylation, a preferable procedure heats the reaction solution to or above the melt temperature of the liquid crystalline polyester under reduced pressure to enable deacetylation polymerization. The melt polymerization method is advantageous to produce the homogeneous polymer and preferably gives the excellent liquid crystalline polyester with less gas evolution and its resin composition.

The temperature of deacetylation polymerization may be the general melt temperature of the liquid crystalline polyester, for example, in a range of 250 to 365° C. and is preferably the temperature of the melting point of the liquid crystalline polyester+at least 10° C. The pressure reduction during polymerization is generally 0.1 mmHg (13.3 Pa) to 20 mmHg (2660 Pa), preferably not higher than 10 mmHg (1330 Pa) and more preferably not higher than 5 mmHg (665 Pa). The acetylation and the polymerization may be performed successively in one identical reaction vessel or may be performed in different reaction vessels.

Specifically, to facilitate control of $\Delta S$ (entropy of melting) of the liquid crystalline polyester to the above desired range, a preferable procedure increases the jacket temperature of the polymerization vessel in the deacetylation polymerization process at an average rate of temperature increase from 270° C. to the maximum temperature of polymerization set to 1.0 to 1.6° C./minute. Setting the average rate of temperature increase from 270° C. to the maximum temperature of polymerization to 1.0 to 1.6° C./minute enables control of the oligomerization reaction of the acetylated monomer. This controls the molecular weight distribution of the polymer and the reactivity of p-hydroxybenzoic acid that is likely to be blocked and thus readily gives the liquid crystalline polyester having $\Delta S$ (entropy of melting) of 1.0 to $3.0 \times 10^{-3}$ J/g·K.

In other words, setting the average rate of temperature increase from 270° C. to the maximum temperature of polymerization to be not lower than 1.0° C./minute enables rapid polymerization and adequate blocking of p-hydroxybenzoic acid, while preventing a change in composition of the liquid crystalline polymer accompanied with an increase in melt residence time. This readily gives the liquid crystalline polyester having $\Delta S$ (entropy of melting) of not less than $1.0 \times 10^{-3}$ J/g·K. The average rate of temperature increase is preferably not lower than 1.2° C./minute and more preferably not lower than 1.4° C./minute. Setting the average rate of temperature increase from 270° C. to the maximum temperature of polymerization to be not higher than 1.6° C./minute, on the other hand, adequately controls the reactivity and the blocking degree of p-hydroxybenzoic acid. This readily gives the liquid crystalline polyester having $\Delta S$ (entropy of melting) of not greater than $3.0 \times 10^{-3}$ J/g·K. Such setting also enables the internal temperature to easily follow an increase in jacket temperature of the polymerization vessel, thus improving the productivity. With respect to the average rate of jacket temperature increase of the polymerization vessel, the average rate of temperature increase from 270° C. to the maximum temperature of polymerization as the jacket temperature of the polymerization vessel is noted, since the oligomerization reaction of the acetylated monomer starts at the temperature of about 270° C.

An available method of taking the resulting polymer out of the reaction vessel after completion of polymerization may increase the internal pressure of the reaction vessel at a temperature at which the polymer melts to discharge the polymer from an outlet provided in the reaction vessel and subsequently cool down the discharged polymer in cooling solution. The internal pressure of the reaction vessel may be increased to, for example, 0.02 to 0.5 MPa. The outlet may be provided in the bottom portion of the reaction vessel. The polymer may be discharged to form strands from the outlet. Resin pellets may be produced by cutting the polymer cooled down in cooling solution into pellets.

In the process of producing the liquid crystalline polyester, the solid phase polymerization method may be employed to complete the polymerization reaction. For example, an available method may crush the polymer or the oligomer of the liquid crystalline polyester with a mill and heat the crushed polymer or oligomer in nitrogen flow or under reduced pressure to enable polymerization to a desired degree of polymerization and complete the reaction. The heating conditions may be 1 to 50 hours in a temperature range of the melting point of the liquid crystalline polyester −5° C. to the melting point −50° C. (for example, 200 to 300° C.).

The polymerization reaction of the liquid crystalline polyester can proceed without a catalyst, but a metal compound, such as tin (II) acetate, tetrabutyl titanate, potassium acetate, sodium acetate, antimony trioxide, and metal magnesium may be used as the catalyst.

A resin composition may be produced by adding a filler to the liquid crystalline polymer in a specific range that does not damage the advantageous effects. Since the filler has the reinforcing effect, adding the filler preferably enhances the advantageous effects. The filler may be, for example, fibrous filler, plate-like filler, powdery filler or granular filler. More specifically, available examples of the filler include: glass fiber; PAN-derived or pitch-derived carbon fibers; metal fibers such as stainless steel fiber, aluminum fiber and brass fiber; organic fibers such as aromatic polyamide fiber and liquid crystalline polyester fiber; fibrous or whisker fillers such as plaster fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, silicon nitride whisker and needle-like titanium oxide; and powdery, granular or plate-like fibers such as mica, talc, kaolin, silica, glass bead, glass flake, clay, molybdenum disulfide, wollastonite, titanium oxide, zinc oxide, calcium polyphosphate and graphite. The surface of the filler used may be treated with a known coupling agent (for example, silane coupling agent or titanate coupling agent) or another surface treatment agent.

Among these fillers, the glass fiber is especially preferable to further improve the strength to winding. The type of the glass fiber is not specifically limited but may be any glass fiber generally used for reinforcement of resin and selected among, for example, long fibers and short fibers such as chopped strands and milled fibers. The glass fiber used is preferably alkalescent to have the favorable mechanical strength. Specifically the glass fiber having the silicon oxide content of 50 to 80 wt % is preferably used, and the glass fiber having the silicon oxide content of 65 to 77 wt % is more preferable. The glass fiber is preferably treated with, e.g., an epoxy, urethane, or acrylic covering agent or binder, and using the epoxy agent is especially preferable. The glass fiber is preferably treated with, e.g., a silane or titanate coupling agent or another surface treatment agent, and using an epoxy silane or aminosilane coupling agent is especially preferable. The glass fiber may be covered or bound with a thermoplastic resin such as ethylene/vinyl acetate copolymer or a thermosetting resin such as epoxy resin. Two or more different types of fillers may be used in combination.

The content of the filler is preferably not less than 10 parts by weight relative to 100 parts by weight of the liquid crystalline polyester, more preferably not less than 20 parts by weight and further more preferably not less than 30 parts by weight. The content of the filler is, on the other hand, preferably not greater than 200 parts by weight, more preferably not greater than 150 parts by weight and further more preferably not greater than 100 parts by weight.

Any of general additives selected from the following may be further added to the liquid crystalline polyester resin composition in a specific range that does not damage the advantageous effects: antioxidants, heat stabilizers (e.g., hindered phenol, hydroquinone, phosphites and their substitutes), UV absorbers (e.g., resorcinol and salicylate), color protection agents such as phosphites and hypophosphites, lubricants, mold release agents (e.g., montanic acid and its metal salts, its esters, its half esters, stearyl alcohol, stearamide and polyethylene wax), coloring agents containing dyes or pigments, carbon black functioning as conductive agent or coloring agent, crystal nucleating agents, plasticizers, flame retardants (e.g., bromine flame retardants, phosphorus flame retardants, red phosphorus, silicone flame retardants), flame retardant aids and antistatic agents. A polymer other than the liquid crystalline polyester may be added to the resin composition, to provide specified properties additionally.

The method of adding the filler and the other additives to the liquid crystalline polyester is not specifically limited but may be, for example, dry blending, solution mixing, addition during polymerization of the liquid crystalline polyester, or melt-kneading. Especially preferable is melt-kneading. Known methods may be employed for melt-kneading: for example, Banbury mixer, rubber roller, kneader, single-screw extruder and twin-screw extruder. Using the twin-screw extruder is especially preferable. The preferable temperature of melt-kneading is not lower than the melting point of the liquid crystalline polyester but not higher than the melting point+50° C.

Any of the following methods may be employed for kneading: (1) loading the liquid crystalline polyester, the filler and the other additives all together from a main feeder to knead (simultaneous kneading method); (2) loading the liquid crystalline polyester and the other additives together from a main feeder to knead and subsequently adding the filler and the other additives as needed basis from a side feeder to knead (side feeding method); and (3) producing a liquid crystalline polyester resin composition (master pellets) containing the high concentration of the liquid crystalline polyester and the other additives and subsequently kneading the master pellets with the liquid crystalline polyester and the filler to control the concentration to a specified level (master pellet method).

The liquid crystalline polyester resin composition may be formed to a molded product having excellent surface appearance (color tone), mechanical properties, heat resistance and fire resistance by known melt molding such as injection molding, injection compression molding, compression molding, extrusion molding, blow molding, press molding or spinning. The molded product herein may be any of injection molded products, extrusion molded products, press molded products, sheets, pipes, various films including non-oriented films, uniaxially-oriented films and biaxially-oriented films and various fibers including non-drawn fibers and ultra-drawn fibers. Especially preferable is injection molding that gives the remarkable advantageous effects.

The molded product obtained from the liquid crystalline polyester or the liquid crystalline polyester resin composition may be used for, for example: electric and electronic components such as various gears, various casings, sensors, LED lamps, connectors, sockets, resistors, relay cases, relay bases, relay spools, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas and computer components; domestic and office electric appliance components such as video tape recorder components, TV set components, irons, hair dryers, rice cooker components, microwave oven components, acoustic components, audio equipment components for audios, laser-discs and compact disks, lighting components, refrigerator components, air conditioner components, typewriter components and word processor components; optical equipment and precision machine components such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, vehicle motor insulators for power windows, hot air flow control valves, brush holders for radiator motors, water pump impellers, turbine vanes, wiper motor components, distributors, starter switches, starter relays, transmission wire harnesses, windshield washer nozzles, air conditioner panel switch plates, fuel solenoid valve coils, fuse connectors, horn terminals, electric component insulators, step motor rotors, lamp bezels, lamp sockets, lamp reflectors, lamp housings, brake pistons, solenoid bobbins, engine oil filters and ignition cases. This molded product is especially useful for printed circuit boards.

EXAMPLES

The following describes our liquid crystalline polyesters and methods more in detail with reference to examples, although the scope of this disclosure is not limited to these examples.

The liquid crystalline polyester was subjected to composition analysis and characterization by the following methods.

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 μl of a solvent (mixed solvent of pentafluorophenol/1,1,2,2,-tetrachloroethane-$d_2$=65/35 (weight ratio)), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition was analyzed from the ratio of the areas of peaks corresponding to the respective structural units observed in the spectral range of 7 to 9.5 ppm.

(2) Measurement of Melting Point (Tm) and ΔS (Entropy of Melting) of Liquid Crystalline Polyester The melting point was an endothermic peak temperature (Tm3) observed by differential scanning calorimeter DSC-7 (manufactured by PerkinElmer, Inc.) when the liquid crystalline polyester was kept at a temperature of Tm1+20° C. for five minutes after observation of an endothermic peak temperature (Tm2), was subsequently cooled down to room temperature at a rate of temperature decrease of 20° C./minute and was then measured at a rate of temperature increase of 20° C./minute. Here the endothermic peak temperature (Tm2) was observed when the liquid crystalline polyester was kept at the temperature of Tm1+20° C. for five minutes after observation of an endothermic peak temperature (Tm1), was subsequently cooled down to room temperature at the rate of temperature decrease of 20° C./minute and was then measured at the rate of temperature increase of 20° C./minute. Here the endothermic peak temperature (Tm1) was observed when the liquid crystalline polyester was measured at the rate of temperature increase of 20° C./minute from room temperature. ΔS (J/g·K) was calculated from the melting point and its endothermic peak area (ΔHm3) according to Equation [1]. In Production Examples described below, the melting point is expressed as Tm, and the entropy of melting is expressed as ΔS:

$$\Delta S(J/g\cdot K)=\Delta Hm(J/g)/Tm(K) \quad [1].$$

(3) Measurement of Molecular Weights and Degree of Dispersion of Liquid Crystalline Polyester The number-average molecular weight and the weight-average molecular weight of the liquid crystalline polyester were measured by gel permeation chromatography (GPC)/LALLS method under the following conditions. The degree of dispersion (Mw/Mn) was calculated by dividing the weight-average molecular weight (Mw) by the number-average molecular weight (Mn).

(GPC)
GPC Apparatus: Manufactured by Waters Corporation
Detector: Differential refractive index detector R12410 (manufactured by Waters Corporation)
Column: Shodex K-806M (two) and K-802 (one) (manufactured by Showa Denko K.K.)
Eluent: Pentafluorophenol/chloroform (35/65 w/w %)
Measurement Temperature: 23° C.
Flow Rate: 0.8 mL/min
Sample Injection Volume: 200 μL (Concentration: 0.1%)
(LALLS)
Device: Low-angle laser light scattering photometer KMX-6 (manufactured by Chromatix, Inc.)
Detector Wavelength: 633 nm (He—Ne)
Detector Temperature: 23° C.

(4) Measurement of Melt Viscosity of Liquid Crystalline Polyester

The melt viscosity was measured at the shear rate of 1000/second at the temperature of the melting point of the liquid crystalline polyester+10° C. by Koka-type flow tester CFT-500D (orifice: 0.5ϕ×10 mm) (manufactured by Shimadzu Corporation).

As the liquid crystalline polyester, twelve different liquid crystalline polyesters (a-1) to (a-6) and (b-1) to (b-5) and (b-1') were produced in Production Examples 1 to 12. Each of the produced liquid crystalline polyesters was subjected to composition analysis, measurement of melting point (Tm) and ΔS (entropy of melting), measurement of molecular weights and degree of dispersion and measurement of melt viscosity described above. The following describes the methods of producing the respective liquid crystalline polyesters and the measurement results of the respective liquid crystalline polyesters.

Production Example 1

In a 5 L reaction vessel with stirring blades and a distillation pipe, 932 parts by weight of p-hydroxybenzoic acid, 251 parts by weight of 4,4'-dihydroxybiphenyl, 99 parts by weight of hydroquinone, 284 parts by weight of terephthalic acid, 90 parts by weight of isophthalic acid and 1252 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.68° C./minute from 145° C. to 270° C. and at an average rate of temperature increase of 1.4° C./minute from 270° C. to 350° C. The heating time was 4 hours. The polymerization temperature was kept at 350° C., and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm$^2$ (0.1 MPa), and the polymer was discharged to form strands via nozzles, each having a circular outlet of 10 mm in diameter, and was pelletized with a cutter to give liquid crystalline polyester (a-1).

According to the result of composition analysis of this liquid crystalline polyester (a-1), the ratio of the p-hydroxybenzoic acid-derived structural unit (structural unit (I)) to the sum of the p-hydroxybenzoic acid-derived structural unit (structural unit (I)), the 4,4'-dihydroxybiphenyl-derived structural unit (structural unit (II)) and the hydroquinone-derived structural unit (structural unit (III)) was 75 mol %. The ratio of the 4,4'-dihydroxybiphenyl-derived structural unit (structural unit (II)) to the sum of the 4,4'-dihydroxybiphenyl-derived structural unit (structural unit (II)) and the hydroquinone-derived structural unit (structural unit (III)) was 60 mol %. The ratio of the terephthalic acid-derived structural unit (structural unit (IV)) to the sum of the terephthalic acid-derived structural unit (structural unit (IV)) and the isophthalic acid-derived structural unit (structural unit (V)) was 76 mol %. The total amount of the 4,4'-dihydroxybiphenyl-derived structural unit (structural unit (II)) and the hydroquinone-derived structural unit (structural unit (III)) was substantially equimolar with the total amount of the terephthalic acid-derived structural unit (structural unit (IV)) and the isophthalic acid-derived structural unit (structural unit (V)). Tm was 330° C.; ΔS was 2.2×10$^{-3}$ J/g·K; the number-average molecular weight was 11,800; the degree of dispersion was 1.8; the melt viscosity was 28 Pa·s.

Production Example 2

In a 5 L reaction vessel with stirring blades and a distillation pipe, 907 parts by weight of p-hydroxybenzoic acid, 294 parts by weight of 4,4'-dihydroxybiphenyl, 94 parts by weight of hydroquinone, 343 parts by weight of terephthalic acid, 61 parts by weight of isophthalic acid and 1272 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.63° C./minute from 145° C. to 270° C. and at an average rate of temperature increase of 1.6° C./minute from 270° C. to 335° C. The heating time was 4 hours. The polymerization temperature was kept at 335° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm$^2$ (0.1 MPa), and the polymer was discharged to form strands via nozzles, each having a circular outlet of 10 mm in diameter, and was pelletized with a cutter to give liquid crystalline polyester (a-2).

According to the result of composition analysis of this liquid crystalline polyester (a-2), the ratio of the structural unit (I) to the sum of the structural unit (I), the structural unit (II) and the structural unit (III) was 73 mol %. The ratio of the structural unit (II) to the sum of the structural unit (II) and the structural unit (III) was 65 mol %. The ratio of the structural unit (IV) to the sum of the structural unit (IV) and the structural unit (V) was 85 mol %. The total amount of the structural unit (II) and the structural unit (III) was substantially equimolar with the total amount of the structural unit (IV) and the structural unit (V). Tm was 317° C.; ΔS was 1.5×10$^{-3}$ J/g·K; the number-average molecular weight was 10,900; the degree of dispersion was 2.0; the melt viscosity was 23 Pa·s.

Production Example 3

In a 5 L reaction vessel with stirring blades and a distillation pipe, 970 parts by weight of p-hydroxybenzoic acid, 258 parts by weight of 4,4'-dihydroxybiphenyl, 65 parts by weight of hydroquinone, 230 parts by weight of terephthalic acid, 99 parts by weight of isophthalic acid and 1222 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.72° C./minute from 145° C. to 270° C. and at an average rate of temperature increase of 1.2° C./minute from 270° C. to 350° C. The heating time was 4 hours. The polymerization temperature was kept at 350° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm$^2$ (0.1 MPa), and the polymer was discharged to form strands via nozzles, each having a circular outlet of 10 mm in diameter, and was pelletized with a cutter to give liquid crystalline polyester (a-3).

According to the result of composition analysis of this liquid crystalline polyester (a-3), the ratio of the structural unit (I) to the sum of the structural unit (I), the structural unit (II) and the structural unit (III) was 78 mol %. The ratio of the structural unit (II) to the sum of the structural unit (II) and the structural unit (III) was 70 mol %. The ratio of the structural unit (IV) to the sum of the structural unit (IV) and the structural unit (V) was 70 mol %. The total amount of the structural unit (II) and the structural unit (III) was substantially equimolar with the total amount of the structural unit (IV) and the structural unit (V). Tm was 338° C.; ΔS was 2.6×10$^{-3}$ J/g·K; the number-average molecular weight was 13,200; the degree of dispersion was 2.2; the melt viscosity was 40 Pa·s.

Production Example 4

In a 5 L reaction vessel with stirring blades and a distillation pipe, 870 parts by weight of p-hydroxybenzoic acid, 292 parts by weight of 4,4'-dihydroxybiphenyl, 125 parts by weight of hydroquinone, 292 parts by weight of terephthalic acid, 157 parts by weight of isophthalic acid and 1302 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.64° C./minute from 145° C. to 270° C. and at an average rate of temperature increase of 1.3° C./minute from 270° C. to 330° C. The heating time was 4 hours. The polymerization temperature was kept at 330° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm$^2$ (0.1 MPa), and the polymer was discharged to form strands via nozzles, each having a circular outlet of 10 mm in diameter, and was pelletized with a cutter to give liquid crystalline polyester (a-4).

According to the result of composition analysis of this liquid crystalline polyester (a-4), the ratio of the structural unit (I) to the sum of the structural unit (I), the structural unit (II) and the structural unit (III) was 70 mol %. The ratio of the structural unit (II) to the sum of the structural unit (II) and the structural unit (III) was 58 mol %. The ratio of the structural unit (IV) to the sum of the structural unit (IV) and the structural unit (V) was 65 mol %. The total amount of the structural unit (II) and the structural unit (III) was substantially equimolar with the total amount of the structural unit (IV) and the structural unit (V). Tm was 310° C.; ΔS was $1.2 \times 10^{-3}$ J/g·K; the number-average molecular weight was 12,000; the degree of dispersion was 2.1; the melt viscosity was 30 Pa·s.

Production Example 5

In a 5 L reaction vessel with stirring blades and a distillation pipe, 845 parts by weight of p-hydroxybenzoic acid, 402 parts by weight of 4,4'-dihydroxybiphenyl, 79 parts by weight of hydroquinone, 407 parts by weight of terephthalic acid, 72 parts by weight of isophthalic acid and 1322 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.67° C./minute from 145° C. to 270° C. and at an average rate of temperature increase of 1.1° C./minute from 270° C. to 330° C. The heating time was 4 hours. The polymerization temperature was kept at 330° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm² (0.1 MPa), and the polymer was discharged to form strands via nozzles, each having a circular outlet of 10 mm in diameter, and was pelletized with a cutter to give liquid crystalline polyester (a-5).

According to the result of composition analysis of this liquid crystalline polyester (a-5), the ratio of the structural unit (I) to the sum of the structural unit (I), the structural unit (II) and the structural unit (III) was 68 mol %. The ratio of the structural unit (II) to the sum of the structural unit (II) and the structural unit (III) was 75 mol %. The ratio of the structural unit (IV) to the sum of the structural unit (IV) and the structural unit (V) was 85 mol %. The total amount of the structural unit (II) and the structural unit (III) was substantially equimolar with the total amount of the structural unit (IV) and the structural unit (V). Tm was 309° C.; ΔS was $1.1 \times 10^{-3}$ J/g·K; the number-average molecular weight was 11,300; the degree of dispersion was 2.3; the melt viscosity was 26 Pa·s.

Production Example 6

In a 5 L reaction vessel with stirring blades and a distillation pipe, 994 parts by weight of p-hydroxybenzoic acid, 184 parts by weight of 4,4'-dihydroxybiphenyl, 89 parts by weight of hydroquinone, 179 parts by weight of terephthalic acid, 120 parts by weight of isophthalic acid and 1202 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.81° C./minute from 145° C. to 270° C. and at an average rate of temperature increase of 1.0° C./minute from 270° C. to 355° C. The heating time was 4 hours. The polymerization temperature was kept at 355° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm² (0.1 MPa), and the polymer was discharged to form strands via nozzles, each having a circular outlet of 10 mm in diameter, and was pelletized with a cutter to give liquid crystalline polyester (a-6).

According to the result of composition analysis of this liquid crystalline polyester (a-6), the ratio of the structural unit (I) to the sum of the structural unit (I), the structural unit (II) and the structural unit (III) was 80 mol %. The ratio of the structural unit (II) to the sum of the structural unit (II) and the structural unit (III) was 55 mol %. The ratio of the structural unit (IV) to the sum of the structural unit (IV) and the structural unit (V) was 60 mol %. The total amount of the structural unit (II) and the structural unit (III) was substantially equimolar with the total amount of the structural unit (IV) and the structural unit (V). Tm was 344° C.; ΔS was $2.7 \times 10^{-3}$ J/g·K; the number-average molecular weight was 12,700; the degree of dispersion was 2.5; the melt viscosity was 35 Pa·s.

Production Example 7

In a 5 L reaction vessel with stirring blades and a distillation pipe, 808 parts by weight of p-hydroxybenzoic acid, 352 parts by weight of 4,4'-dihydroxybiphenyl, 139 parts by weight of hydroquinone, 288 parts by weight of terephthalic acid, 235 parts by weight of isophthalic acid and 1352 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.68° C./minute from 145° C. to 270° C. and at an average rate of temperature increase of 0.9° C./minute from 270° C. to 320° C. The heating time was 4 hours. The polymerization temperature was kept at 320° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm² (0.1 MPa), and the polymer was discharged to form strands via nozzles, each having a circular outlet of 10 mm in diameter, and was pelletized with a cutter to give liquid crystalline polyester (b-1).

According to the result of composition analysis of this liquid crystalline polyester (b-1), the ratio of the structural unit (I) to the sum of the structural unit (I), the structural unit (II) and the structural unit (III) was 65 mol %. The ratio of the structural unit (II) to the sum of the structural unit (II) and the structural unit (III) was 60 mol %. The ratio of the structural unit (IV) to the sum of the structural unit (IV) and the structural unit (V) was 55 mol %. The total amount of the structural unit (II) and the structural unit (III) was substantially equimolar with the total amount of the structural unit (IV) and the structural unit (V). Tm was 303° C.; ΔS was $0.8 \times 10^{-3}$ J/g·K; the number-average molecular weight was 13,500; the degree of dispersion was 2.7; the melt viscosity was 43 Pa·s.

Production Example 8

In a 5 L reaction vessel with stirring blades and a distillation pipe, 1057 parts by weight of p-hydroxybenzoic acid, 151 parts by weight of 4,4'-dihydroxybiphenyl, 59 parts by weight of hydroquinone, 202 parts by weight of terephthalic acid, 22 parts by weight of isophthalic acid and 1152 parts by weight of acetic anhydride (1.09 equivalents of the total amount of phenolic hydroxyl group) were mixed, were reacted with stirring in nitrogen atmosphere at 145° C. for 1 hour, and were then heated to increase the jacket temperature at an average rate of temperature increase of 0.71° C./minute from 145° C. to 270° C. and at an average rate of temperature increase of 1.5° C./minute from 270° C. to 365° C. The heating time was 4 hours. The polymerization temperature was kept at 365° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm² (0.1 MPa), and the polymer was discharged to form strands via nozzles, each having a circular outlet of 10 mm in diameter, and was pelletized with a cutter to give liquid crystalline polyester (b-2).

According to the result of composition analysis of this liquid crystalline polyester (b-2), the ratio of the structural unit (I) to the sum of the structural unit (I), the structural unit (II) and the structural unit (III) was 85 mol %. The ratio of the structural unit (II) to the sum of the structural unit (II) and the structural unit (III) was 60 mol %. The ratio of the structural unit (IV) to the sum of the structural unit (IV) and the structural unit (V) was 90 mol %. The total amount of the structural unit (II) and the structural unit (III) was substantially equimolar with the total amount of the structural unit (IV) and the structural unit (V). Tm was 351° C.; ΔS was $3.2 \times 10^{-3}$ J/g·K; the number-average molecular weight was 12,200; the degree of dispersion was 2.6; the melt viscosity was 31 Pa·s.

Production Example 9

Liquid crystalline polyester (b-3) was produced by polymerization performed in the same manner as Production Example 1, except that the average rate of temperature increase from 145° C. to 270° C. was changed to 0.83° C./minute and the average rate of temperature increase from 270° C. to 350° C. was changed to 0.9° C./minute.

According to the result of composition analysis of this liquid crystalline polyester (b-3), the ratio of the structural unit (I) to the sum of the structural unit (I), the structural unit (II) and the structural unit (III) was 75 mol %. The ratio of the structural unit (II) to the sum of the structural unit (II) and the structural unit (III) was 60 mol %. The ratio of the structural unit (IV) to the sum of the structural unit (IV) and the structural unit (V) was 76 mol %. The total amount of the structural unit (II) and the structural unit (III) was substantially equimolar with the total amount of the structural unit (IV) and the structural unit (V). Tm was 331° C.; ΔS was $0.9 \times 10^{-3}$ J/g·K; the number-average molecular weight was 12,100; the degree of dispersion was 2.6; the melt viscosity was 31 Pa·s.

Production Example 10

Liquid crystalline polyester (b-4) was produced by polymerization performed in the same manner as Production Example 1, except that the average rate of temperature increase from 145° C. to 270° C. was changed to 0.65° C./minute and the average rate of temperature increase from 270° C. to 350° C. was changed to 1.7° C./minute.

According to the result of composition analysis of this liquid crystalline polyester (b-4), the ratio of the structural unit (I) to the sum of the structural unit (I), the structural unit (II) and the structural unit (III) was 75 mol %. The ratio of the structural unit (II) to the sum of the structural unit (II) and the structural unit (III) was 60 mol %. The ratio of the structural unit (IV) to the sum of the structural unit (IV) and the structural unit (V) was 76 mol %. The total amount of the structural unit (II) and the structural unit (III) was substantially equimolar with the total amount of the structural unit (IV) and the structural unit (V). Tm was 330° C.; ΔS was $3.1 \times 10^{-3}$ J/g·K; the number-average molecular weight was 12,000; the degree of dispersion was 2.6; the melt viscosity was 30 Pa·s.

Production Example 11

In a 5 L reaction vessel with stirring blades and a distillation pipe, 995 parts by weight of p-hydroxybenzoic acid, 126 parts by weight of 4,4'-dihydroxybiphenyl, 112 parts by weight of terephthalic acid, 216 parts by weight of polyethylene terephthalate and 969 parts by weight of acetic anhydride (1.09 equivalents of the total amount of phenolic hydroxyl group) were mixed, were reacted with stirring in nitrogen atmosphere at 130° C. for 2 hours, and were then heated to increase the jacket temperature at an average rate of temperature increase of 0.71° C./minute from 130° C. to 270° C. and at an average rate of temperature increase of 1.5° C./minute from 270° C. to 335° C. The heating time was 4 hours. The polymerization temperature was kept at 335° C. and the pressure was reduced to 1.0 mmHg (133 Pa) in 1.0 hour. The reaction further proceeded under the reduced pressure. The polymerization was terminated when the torque required for stirring reached 20 kg·cm. The reaction vessel was then pressurized to 1.0 kg/cm² (0.1 MPa), and the polymer was discharged to form strands via nozzles, each having a circular outlet of 10 mm in diameter, and was pelletized with a cutter to give liquid crystalline polyester (b-5).

According to the result of composition analysis of this liquid crystalline polyester (b-5), the structural unit (I) was 66.7 mol %, the structural unit (II) was 6.3 mol %, the ethylenedioxy unit derived from polyethylene terephthalate was 10.4 mol % and the structural unit (IV) was 16.6 mol %. Tm was 313° C.; ΔS was $1.9 \times 10^{-3}$ J/g·K; the number-average molecular weight was 9.800; the degree of dispersion was 2.8; the melt viscosity was 13 Pa·s.

Production Example 12

The liquid crystalline polyester (b-1) of Production Example 7 was used. The polymer was vacuum-dried at 160° C. for 12 hours, was subsequently melt-extruded with a single-screw extruder of 15 mmφ manufactured by Osaka Seiki Kosaku Corporation, and was weighed and supplied to a spin pack by a gear pump. The spin pack filtered the polymer with a filter of non-woven metal fabric and discharged the polymer from nozzles. The discharged polymer was passed through a heat retention area of 40 mm and was subsequently cooled down from outside of filaments with circular cooling air flow at 25° C. to be solidified. After addition of an oil-in-water emulsion of a polyether compound-based lubricating agent and a lauryl alcohol-based emulsifier, all filaments were hauled off by a first godet roll. After the filaments were passed through a second godet roll at the same rate, all the filaments but one were sucked by a suction gun, while the remaining one filament was wound in the pirn shape via a dancer arm by a pirn winder (EFT take-up winder with no contact roll that is in contact with a wind-up package, manufactured by Kamitsu Seisakusho LTD).

According to the result of composition analysis of this liquid crystalline polyester (b-1'), the ratio of the structural unit (I) to the sum of the structural unit (I), the structural unit (II) and the structural unit (III) was 65 mol %. The ratio of the structural unit (II) to the sum of the structural unit (II) and the structural unit (III) was 60 mol %. The ratio of the structural unit (IV) to the sum of the structural unit (IV) and the structural unit (V) was 55 mol %. The total amount of the structural unit (II) and the structural unit (III) was substantially equimolar with the total amount of the structural unit (IV) and the structural unit (V).

In differential scanning calorimetry, after observation of an endothermic peak temperature (Tm1) in measurement with heating the spun polymer at a rate of temperature of 20° C./minute from room temperature, an endothermic peak temperature (Tm2) was observed when temperature was sequentially maintained at Tm1+20° C. for 5 minutes, decreased to room temperature at a rate of 20° C./minute, and increased again at a rate of 20° C./minute. After observation of the endothermic peak temperature (Tm2), the endothermic peak temperature (Tm3) was observed when temperature was sequentially maintained at Tm1+20° C. for 5 minutes, decreased to room temperature at a rate of 20° C./minute, and increased again at a rate of 20° C./minute. Endothermic peak areas at Tm2 and Tm3 were respectively specified as $\Delta$Hm2 and $\Delta$Hm3, and $\Delta$S2 and $\Delta$S3 were calculated from Tm2 and Tm3 and $\Delta$Hm2 and $\Delta$Hm3. Tm2 was 313° C. and $\Delta$S2 was $1.8\times10^{-3}$ J/g·K, while Tm3 was 303° C. and $\Delta$S3 was $0.8\times10^{-3}$ J/g·K.

Table 1 shows the results of composition analysis of the liquid crystalline polyesters obtained in the respective Production Examples, the average rate of temperature increase when the jacket temperature was increased from 270° C. to the maximum temperature of polymerization during deacetylation polymerization for production of each of the liquid crystalline polyesters, $\Delta$S and the degree of dispersion.

parative Examples 1 to 5. The liquid crystalline polyesters of Examples 1 to 6 and Comparative Examples 1 to 5 were subjected to evaluations (1) to (3) described below. The results of evaluation are shown in Table 2.

(1) Evaluation of Precision Molding Stability

Each of the liquid crystalline polyesters was set in an injection molding machine FANUC α30C (screw diameter: 28 mm, manufactured by FANUC Corporation). The metering time for 8 mm and the peak pressure during molding with a mold for 0.3 mm-pitch, 70-core fine pitch connector (wall thickness: 0.2 mm) were measured under the conditions of the cylinder temperature set to the melting point of the liquid crystalline polyester+10° C., the screw rotation speed of 150 rpm and the back pressure of 2.0 MPa. Such measurement was repeated for 500 shots. The precision molding stability was evaluated by calculating the standard deviations of the metering time and the peak pressure.

(2) Evaluation of Dimensional Stability Under Reflow

The fine pitch connector obtained by the method of the above evaluation (1) was subjected to reflow process with a reflow simulator Core 9030c (manufactured by CORES Corporation). The reflow process preheated the fine pitch connector at 200° C. for 2 minutes after increasing the temperature to 200° C. at a rate of 1.6° C./second, reflowed the fine pitch connector for 30 seconds at the maximum surface temperature of 260° C. and cooled down the fine pitch connector to room temperature. The warpage was measured before and after the reflow process. The dimensional change under

TABLE 1

|  |  | (I)/<br>[(I) + (II) + (III)]<br>(mol %) | (II)/<br>[(II) + (III)]<br>(mol %) | (IV)/<br>[(IV) + (V)]<br>(mol %) | Rate of<br>Temperature<br>Increase<br>° C./min | $\Delta$S/$10^{-3}$<br>(J/g · K) | Degree of<br>Dispersion |
|---|---|---|---|---|---|---|---|
| PRODUCTION EX 1 | a-1 | 75 | 60 | 76 | 1.4 | 2.2 | 1.8 |
| PRODUCTION EX 2 | a-2 | 73 | 65 | 85 | 1.6 | 1.5 | 2.0 |
| PRODUCTION EX 3 | a-3 | 78 | 70 | 70 | 1.2 | 2.6 | 2.2 |
| PRODUCTION EX 4 | a-4 | 70 | 58 | 65 | 1.3 | 1.2 | 2.1 |
| PRODUCTION EX 5 | a-5 | 68 | 75 | 85 | 1.1 | 1.1 | 2.3 |
| PRODUCTION EX 6 | a-6 | 80 | 55 | 60 | 1.0 | 2.7 | 2.5 |
| PRODUCTION EX 7 | b-1 | 65 | 60 | 55 | 0.9 | 0.8 | 2.7 |
| PRODUCTION EX 8 | b-2 | 85 | 60 | 90 | 1.5 | 3.2 | 2.6 |
| PRODUCTION EX 9 | b-3 | 75 | 60 | 76 | 0.9 | 0.9 | 2.6 |
| PRODUCTION EX 10 | b-4 | 75 | 60 | 76 | 1.7 | 3.1 | 2.6 |
| PRODUCTION EX 11 | b-5 | HBA/DHB/EG/TPA = 66.7/6.3/10.4/16.6 | | | 1.5 | 1.9 | 2.8 |
| PRODUCTION EX 12 | b-1' | 65 | 60 | 55 | 0.9 | 0.8 | 2.7 |

Examples 1 to 6

Comparative Examples 1 to 5

The pellets of the liquid crystalline polyesters ((a-1) to (a-6), (b-1) to (b-5)) obtained in the respective Production Examples were dried with hot air. The hot-air dried liquid crystalline polyesters (a-1) to (a-6) were respectively specified as liquid crystalline polyesters of Examples 1 to 6. The hot-air dried liquid crystalline polyesters (b-1) to (b-5) were respectively specified as liquid crystalline polyesters of Comreflow was evaluated as the percentage of the warpage after reflow to the warpage before reflow. The longitudinal direction of the fine pitch connector was placed on a horizontal surface plate, and the maximum displacement of the bottom face of the fine pitch connector to the horizontal surface plate was measured as the warpage by a universal projector (V-16A (manufactured by Nikon Corporation)). FIG. 1 is a conceptual diagram illustrating a measurement site of warpage. The measured length of warpage is shown as warpage 3 in FIG. 1.

(3) Evaluation of Strength to Insulator Winding (Evaluation of Strength of a Small Thin-Walled Molded Product)

Each of the liquid crystalline polyesters was set in an injection molding machine FANUC α30C (screw diameter: 28 mm, manufactured by FANUC Corporation) and was molded to a cylindrical molded product having the height of 25 mm, 1.5 mm ϕ, and the wall thickness of 0.15 mm under the condition of the cylinder temperature set to the melting point of the liquid crystalline polyester+10° C. A load was applied to the molded product with Tensilon UTR-1T manufactured by ORIENTEC CO., LTD by descending a jig having the point angle R of 0.5 at a rate of 0.5 mm/minute, and the primary peak pressure (N) was measured for evaluation of the strength to winding.

(c-4) talc (NK64) manufactured by FUJI TALC INDUSTRIAL CO., LTD.

Examples 7 to 18, Comparative Examples 6 to 16

In a TEM 35B twin-screw extruder with side feeder manufactured by TOSHIBA MACHINE CO., LTD., each of the liquid crystalline polyesters ((a-1) to (a-6), (b-1) to (b-5)) obtained in the respective Production Examples was loaded from the hopper, while the fillers ((c-1) to (c-4)) of the respective amounts shown in Table 3 were added from the side feeder relative to 100 parts by weight of the liquid crystalline polyester. The mixture was melt-kneaded to form pellets at

TABLE 2

| | Liquid Crystalline Resin 100 parts by weight | Precision Molding Stability | | Dimensional Stability under Reflow | | | Strength to Insulator Winding (N) |
|---|---|---|---|---|---|---|---|
| | | Metering Time Standard Deviation | Injection Peak Pressure Standard Deviation | Warpage before Reflow (mm) | Warpage after Reflow (mm) | Rate of Change in Dimension before and after Reflow (%) | |
| EX 1 | a-1 | 0.012 | 1.0 | 0.060 | 0.075 | 125 | 380 |
| EX 2 | a-2 | 0.013 | 1.4 | 0.065 | 0.100 | 154 | 380 |
| EX 3 | a-3 | 0.015 | 1.1 | 0.060 | 0.080 | 133 | 310 |
| EX 4 | a-4 | 0.015 | 1.3 | 0.065 | 0.110 | 169 | 320 |
| EX 5 | a-5 | 0.017 | 1.9 | 0.070 | 0.125 | 179 | 250 |
| EX 6 | a-6 | 0.019 | 2.0 | 0.065 | 0.110 | 169 | 220 |
| COMP EX 1 | b-1 | 0.025 | 4.0 | 0.075 | 0.170 | 227 | 150 |
| COMP EX 2 | b-2 | 0.024 | 3.4 | 0.080 | 0.160 | 200 | 180 |
| COMP EX 3 | b-3 | 0.024 | 3.5 | 0.080 | 0.165 | 206 | 140 |
| COMP EX 4 | b-4 | 0.028 | 3.7 | 0.075 | 0.170 | 227 | 170 |
| COMP EX 5 | b-5 | 0.027 | 3.9 | 0.075 | 0.175 | 233 | 170 |

Liquid crystalline polyester resin compositions of Examples 7 to 18 and Liquid crystalline polyester resin compositions of Comparative Examples 6 to 16 were manufactured by adding fillers to the liquid crystalline polyesters produced in the respective Production Examples. The following fillers were used in the respective Examples and Comparative Examples:

Filler (c)

(c-1) E glass chopped strand (ECS-03T790DE) manufactured by Nippon Electric Glass Co., Ltd.

(c-2) glass milled fiber (EPDE-40M-10A) manufactured by Nippon Electric Glass Co., Ltd.

(c-3) granulated mica "MICALET" (registered trademark) 41PU5 manufactured by YAMAGUCHI MICA CO., LTD.

the cylinder temperature set to the melting point of the liquid crystalline polyester+10° C. The formed pellets of the liquid crystalline polyester resin composition were dried with hot air. The liquid crystalline polyester resin compositions of Examples 7 to 18 and Comparative Examples 6 to 16 were accordingly obtained. The obtained liquid crystalline polyester resin compositions of Examples 7 to 18 and Comparative Examples 6 to 16 were subjected to the above evaluations (1) to (3). The back pressure was set to 1.5 MPa in the evaluation (1) of precision molding stability. In the evaluation (3) of strength to insulator winding, a cylindrical molded product having the height of 25 mm, 1.2 mmϕ and the wall thickness of 0.3 mm was molded at the cylinder temperature set to the melting point of the liquid crystalline polyester+10° C. Table 3 shows the types of the liquid crystalline polyesters and the fillers in the respective Examples and Comparative Examples, their contents and the results of evaluation.

TABLE 3

| | Liquid Crystalline Resin 100 parts by weight | Filler (parts by weight) | Precision Molding Stability | | Dimensional Stability under Reflow | | | Strength to Insulator Winding (N) |
|---|---|---|---|---|---|---|---|---|
| | | | Metering Time Standard Deviation | Injection Peak Pressure Standard Deviation | Warpage before Reflow (mm) | Warpage after Reflow (mm) | Rate of Change in Dimension before and after Reflow (%) | |
| EX 7 | a-1 | c-1(55) | 0.007 | 1.0 | 0.055 | 0.070 | 127 | 430 |
| EX 8 | a-2 | c-1(55) | 0.010 | 1.3 | 0.060 | 0.100 | 167 | 420 |
| EX 9 | a-3 | c-1(55) | 0.014 | 1.1 | 0.055 | 0.075 | 136 | 340 |
| EX 10 | a-4 | c-1(55) | 0.014 | 1.4 | 0.060 | 0.105 | 175 | 350 |
| EX 11 | a-5 | c-1(55) | 0.016 | 1.7 | 0.065 | 0.120 | 185 | 260 |
| EX 12 | a-6 | c-1(55) | 0.017 | 1.8 | 0.060 | 0.100 | 167 | 250 |
| EX 13 | a-1 | c-2(55) | 0.011 | 1.0 | 0.055 | 0.075 | 136 | 400 |
| EX 14 | a-1 | c-3(82) | 0.011 | 1.1 | 0.055 | 0.070 | 127 | 350 |

TABLE 3-continued

| | Liquid Crystalline Resin 100 parts by weight | Filler (parts by weight) | Precision Molding Stability | | Dimensional Stability under Reflow | | | Strength to Insulator Winding (N) |
|---|---|---|---|---|---|---|---|---|
| | | | Metering Time Standard Deviation | Injection Peak Pressure Standard Deviation | Warpage before Reflow (mm) | Warpage after Reflow (mm) | Rate of Change in Dimension before and after Reflow (%) | |
| EX 15 | a-1 | c-4(82) | 0.012 | 1.2 | 0.055 | 0.070 | 127 | 330 |
| EX 16 | a-1 | c-1(31)/c-2(24) | 0.008 | 1.1 | 0.060 | 0.085 | 142 | 450 |
| EX 17 | a-1 | c-1(31)/c-3(24) | 0.009 | 1.1 | 0.055 | 0.065 | 118 | 420 |
| EX 18 | a-1 | c-1(31)/c-4(24) | 0.010 | 1.0 | 0.055 | 0.070 | 127 | 420 |
| COMP EX 6 | b-1 | c-1(55) | 0.022 | 3.5 | 0.070 | 0.160 | 229 | 170 |
| COMP EX 7 | b-2 | c-1(55) | 0.020 | 3.0 | 0.075 | 0.150 | 200 | 230 |
| COMP EX 8 | b-3 | c-1(55) | 0.020 | 3.2 | 0.075 | 0.155 | 207 | 150 |
| COMP EX 9 | b-4 | c-1(55) | 0.021 | 3.4 | 0.070 | 0.150 | 214 | 200 |
| COMP EX 10 | b-5 | c-1(55) | 0.022 | 3.7 | 0.070 | 0.155 | 221 | 210 |
| COMP EX 11 | b-1 | c-2(55) | 0.023 | 3.8 | 0.070 | 0.160 | 229 | 190 |
| COMP EX 12 | b-1 | c-3(82) | 0.022 | 4.5 | 0.065 | 0.135 | 208 | 140 |
| COMP EX 13 | b-1 | c-4(82) | 0.021 | 3.3 | 0.065 | 0.140 | 215 | 140 |
| COMP EX 14 | b-1 | c-1(31)/c-2(24) | 0.024 | 3.8 | 0.070 | 0.160 | 229 | 200 |
| COMP EX 15 | b-1 | c-1(31)/c-3(24) | 0.023 | 3.2 | 0.060 | 0.125 | 208 | 180 |
| COMP EX 16 | b-1 | c-1(31)/c-4(24) | 0.022 | 3.9 | 0.060 | 0.130 | 217 | 190 |

As shown in Tables 2 and 3, the liquid crystalline polyester resin compositions of the respective Examples have a small variation in metering time and a small variation in injection peak pressure and thereby have excellent precision molding stability. The liquid crystalline polyester resin compositions of the respective Examples also have excellent dimensional stability under reflow and high strength to insulator winding and are thus suitable for small precision molded products in electrical and electronic applications.

INDUSTRIAL APPLICABILITY

The liquid crystalline polyester resin composition is effectively used for small precision molded products such as connectors and insulators that require the precision molding stability, the dimensional stability under reflow and the strength of a small thin-walled molded product.

The invention claimed is:

1. A liquid crystalline polyester comprising structural units (I), (II), (III), (IV) and (V), wherein
a ratio of the structural unit (I) to a sum of the structural units (I), (II) and (III) is 68 to 80 mol %, a ratio of the structural unit (II) to a sum of the structural units (II) and (III) is 55 to 75 mol %, and a ratio of the structural unit (IV) to a sum of the structural units (IV) and (V) is 60 to 85 mol %, wherein
a total amount of the structural units (II) and (III) is substantially equimolar with a total amount of the structural units (IV) and (V), and ΔS (entropy of melting) defined by Equation[1] is 1.0 to 3.0×10⁻³ J/g·K:

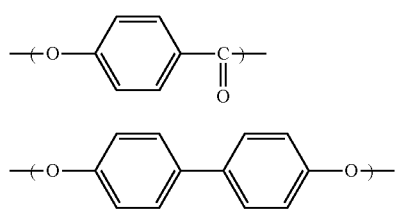

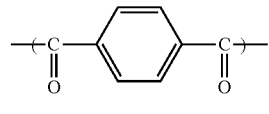

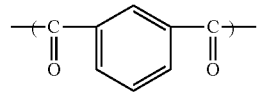

$$\Delta S \ (J/g \cdot K) = \Delta Hm \ (J/g)/Tm \ (K) \quad [1]$$

(Tm means an endothermic peak temperature (Tm3) observed in differential scanning calorimetry of the liquid crystalline polyester, wherein after observation of an endothermic peak temperature (Tm1) in measurement with heating the liquid crystalline polyester at a rate of temperature of 20° C./minute from room temperature, an endothermic peak temperature (Tm2) is observed when temperature is sequentially maintained at Tm1+20° C. for 5 minutes, decreased to room temperature at a rate of 20° C./minute, and increased again at a rate of 20° C./minute, wherein after observation of the endothermic peak temperature (Tm2), the endothermic peak temperature (Tm3) is observed when temperature is sequentially maintained at Tm1+20° C. for 5 minutes, decreased to room temperature at a rate of 20° C./minute, and increased again at a rate of 20° C./minute, and wherein ΔHm represents an endothermic peak area (ΔHm3) at the temperature Tm3).

2. The liquid crystalline polyester according to claim 1, having a degree of dispersion (Mw/Mn) of not greater than 2.5, which is calculated by dividing a weight-average molecular weight (Mw) by a number-average molecular weight (Mn).

3. A method of producing the liquid crystalline polyester according to claim 1, comprising:
reacting acetylating hydroxyl group of an aromatic hydroxycarboxylic acid and an aromatic diol as raw materials of the liquid crystalline polyester with acetic anhydride and then performing deacetylation polymerization to produce the liquid crystalline polyester, wherein a jacket temperature during deacetylation polymerization is raised at an average rate of temperature increase of 1.0 to 1.6° C./minute from 270° C. to a maximum temperature of polymerization.

4. The method according to claim 2, comprising:

reacting acetylating hydroxyl group of an aromatic hydroxycarboxylic acid and an aromatic diol as raw materials of the liquid crystalline polyester with acetic anhydride and then performing deacetylation polymerization to produce the liquid crystalline polyester, wherein a jacket temperature during deacetylation polymerization is raised at an average rate of temperature increase of 1.0 to 1.6° C./minute from 270° C. to a maximum temperature of polymerization.

5. A liquid crystalline polyester resin composition comprising:

10 to 200 parts by weight of a filler added relative to 100 parts by weight of the liquid crystalline polyester according to claim 1.

6. A liquid crystalline polyester resin composition comprising:

10 to 200 parts by weight of a filler added relative to 100 parts by weight of the liquid crystalline polyester according to claim 2.

7. A molded product produced by melt-molding the liquid crystalline polyester according to claim 1.

8. A molded product produced by melt-molding the liquid crystalline polyester according to claim 2.

9. A molded product produced by melt-molding the liquid crystalline polyester resin composition according to claim 5.

10. A molded product produced by melt-molding the liquid crystalline polyester resin composition according to claim 6.

* * * * *